(12) United States Patent
Yu

(10) Patent No.: US 10,548,009 B2
(45) Date of Patent: Jan. 28, 2020

(54) WIRELESS SETUP PROCEDURE ENABLING MODIFICATION OF WIRELESS CREDENTIALS

(71) Applicants: ARRIS ENTERPRISES, INC., Suwanee, GA (US); Haokeng Yu, Guangdong (CN)

(72) Inventor: Haokeng Yu, Shenzhen (CN)

(73) Assignee: ARRIS Enterprises LLC, Suwanee, GA (US)

( * ) Notice: Subject to any disclaimer, the term of this patent is extended or adjusted under 35 U.S.C. 154(b) by 20 days.

(21) Appl. No.: 15/541,344

(22) PCT Filed: Aug. 24, 2015

(86) PCT No.: PCT/CN2015/087923
§ 371 (c)(1),
(2) Date: Jun. 30, 2017

(87) PCT Pub. No.: WO2017/031664
PCT Pub. Date: Mar. 2, 2017

(65) Prior Publication Data
US 2017/0366970 A1   Dec. 21, 2017

(51) Int. Cl.
*H04L 29/06* (2006.01)
*G06F 17/30* (2006.01)
(Continued)

(52) U.S. Cl.
CPC ......... *H04W 12/06* (2013.01); *H04L 63/0428* (2013.01); *H04L 63/06* (2013.01);
(Continued)

(58) Field of Classification Search
CPC .... H04W 12/06; H04L 63/0428; H04L 63/06; H04L 63/083
(Continued)

(56) References Cited

U.S. PATENT DOCUMENTS 6,965,674 B2 * 11/2005 Whelan ................. H04L 9/0891
380/270
7,024,553 B1 * 4/2006 Morimoto ............... H04L 9/083
380/273
(Continued)

FOREIGN PATENT DOCUMENTS

CN        101895884 A       11/2010
WO     2009106003 A1        9/2009

OTHER PUBLICATIONS

Yao Yao; Enhancing RC4 algorithm for WLAN WEP Protocol; IEEE: 2010; p. 3623-3627 (Year: 2010).*
PCT International Search Report & Written Opinion, RE: Application No. PCT/CN2015/087923, dated May 25, 2016.

*Primary Examiner* — Monjur Rahim
(74) *Attorney, Agent, or Firm* — Bart A. Perkins

(57) ABSTRACT

Methods, systems, and computer readable media may be operable to facilitate an overwrite of wireless credentials with user-input credentials. An extended wireless setup may be initiated at an access point when a predetermined input is received. During the extended wireless setup period, the access point may request updated wireless credentials from a user via a direct message or through a web page interface. The access point may overwrite currently used wireless credentials with the updated wireless credentials received from user input, and the access point may use the updated wireless credentials for establishing future wireless connections with one or more stations.

14 Claims, 7 Drawing Sheets

(51) Int. Cl.

| | |
|---|---|
| *G06F 15/16* | (2006.01) |
| *G06F 7/04* | (2006.01) |
| *H04W 12/06* | (2009.01) |
| *H04W 12/04* | (2009.01) |
| *H04W 48/02* | (2009.01) |
| *G06F 3/0481* | (2013.01) |
| *H04W 88/08* | (2009.01) |

(52) U.S. Cl.
CPC ........... *H04L 63/083* (2013.01); *H04W 12/04* (2013.01); *H04W 48/02* (2013.01); *G06F 3/0481* (2013.01); *H04W 88/08* (2013.01)

(58) Field of Classification Search
USPC .......................................................... 726/6
See application file for complete search history.

(56) References Cited

U.S. PATENT DOCUMENTS

| | | | |
|---|---|---|---|
| 2005/0201564 A1* | 9/2005 | Kayashima | H04L 9/0891 380/283 |
| 2006/0149858 A1* | 7/2006 | Bhesania | H04L 63/08 710/5 |
| 2008/0052384 A1* | 2/2008 | Marl | H04L 12/2807 709/223 |
| 2008/0196090 A1* | 8/2008 | Baron | H04L 9/321 726/5 |
| 2011/0243115 A1* | 10/2011 | Chen | H04W 8/245 370/338 |
| 2011/0302411 A1* | 12/2011 | Liang | H04L 63/0823 713/158 |

* cited by examiner

WIRELESS SETUP PROCEDURE ENABLING MODIFICATION OF WIRELESS CREDENTIALS

TECHNICAL FIELD

This disclosure relates to updating wireless credentials at an access point.

BACKGROUND

One or more access points may be installed within a customer premise for the purpose of providing a wireless network for connecting and delivering services to one or more client devices or wireless stations. Generally, an access point is associated with wireless credentials (e.g., password or passphrase, pre-shared key string, service set identifier(s), etc.) that provide a security layer for access to the wireless network. Typically, a wireless access point is pre-configured with a default wireless profile including preset wireless credentials. For example, credentials may be a simple password or a random pre-shared key (PSK) string preset according to vendor specifications.

In order to join a network provided by an access point, or to otherwise associate a wireless client with the access point, a user will typically need to follow one or more of the existing setup procedures. A Wi-Fi protected setup (WPS) button may be used to associate one or more wireless clients with the access point. However, the increasing number of wireless devices within a premise makes this a time-consuming process as the WPS push-button method needs to be completed for each wireless device. A user might enter a preset WPS access point personal identification number (PIN) code to associate a wireless client with the access point. However, this method still requires that a user read or remember the preset PIN code from an access point label. Another method might include a WPS station PIN code that may be entered into a web or software setup wizard graphical user interface (GUI). However, this method requires that the user be familiar with the setup wizard associated with the access point.

A user might wish to change preset or default credentials to enhance network security or to create more easily remembered credentials. For example, preset credentials may be too simple to provide strong protection against hacking or may be too random to be easily remembered by a user. Currently, credentials may be changed by a user through a web or software based setup wizard associated with the access point, but this may be troublesome for a user that is unfamiliar with the setup wizard. For example, it may take time to install a wireless setup wizard utility, to use a wired computer for web GUI access by default, to locate an access point Internet protocol (IP) address for a web GUI configuration login, to find the password for web GUI login, or to locate the proper configuration field in a web GUI. Therefore, a need exists for improving methods and systems for updating wireless credentials at an access point.

BRIEF DESCRIPTION OF THE DRAWINGS

Like reference numbers and designations in the various drawings indicate like elements.

DETAILED DESCRIPTION

Figure 1:
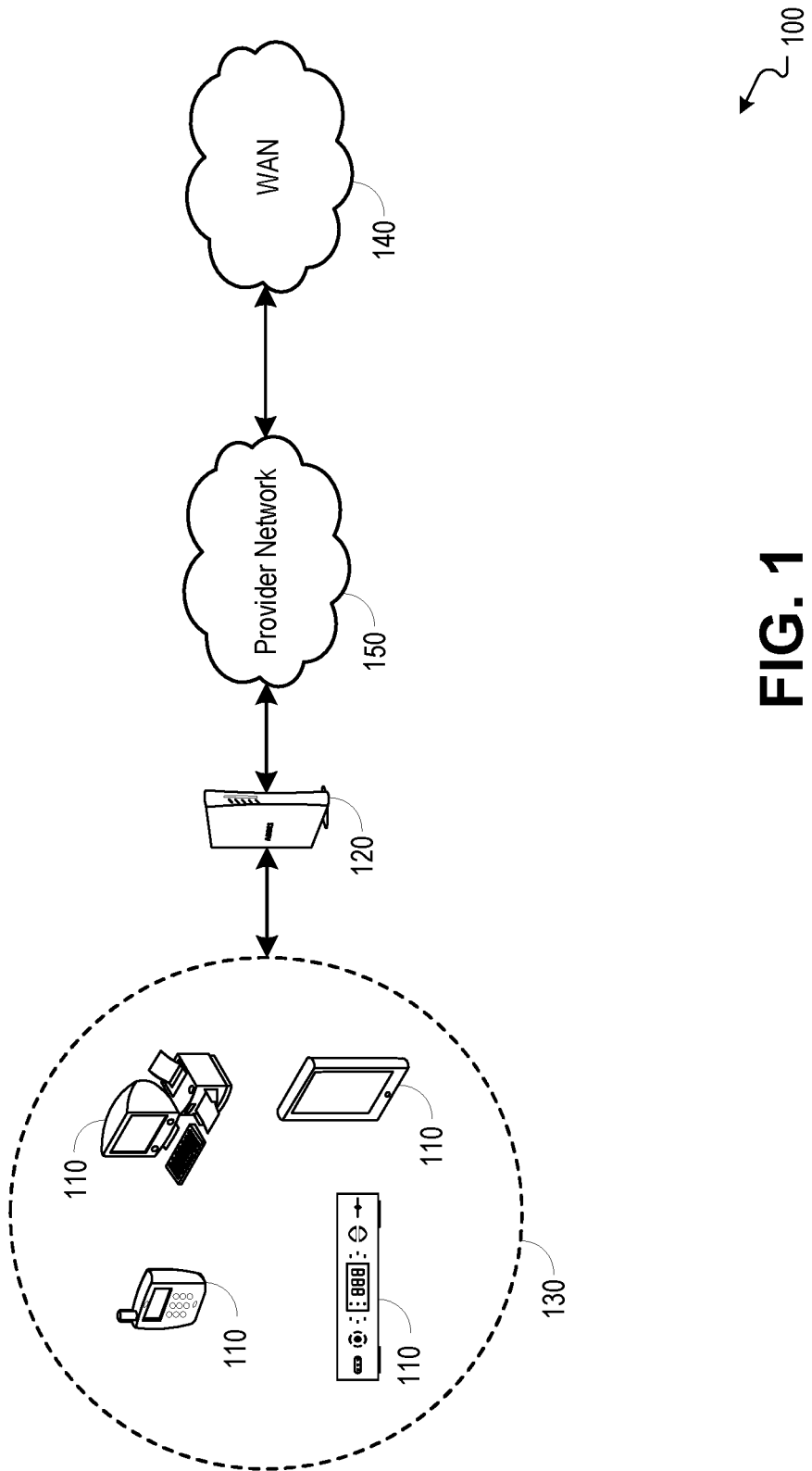
FIG. 1 is a block diagram illustrating an example network environment operable to facilitate an overwrite of wireless credentials with user-input credentials.

It is desirable to improve upon methods and systems for updating wireless credentials at an access point. Methods, systems, and computer readable media may be operable to facilitate an overwrite of wireless credentials with user-input credentials. An extended wireless setup may be initiated at an access point when a predetermined input is received. During the extended wireless setup period, the access point may request updated wireless credentials from a user via a direct message or through a web page interface. The access point may overwrite currently used wireless credentials with the updated wireless credentials received from user input, and the access point may use the updated wireless credentials for establishing future wireless connections with one or more stations.

An embodiment of the invention described herein may include a method comprising: (a) receiving a predetermined input at an access point, wherein the predetermined input signals an initiation of an extended wireless protected setup between the access point and a station; (b) establishing a wireless association between the access point and the station; (c) outputting a request for updated wireless credentials, wherein the request is output to the station; (d) receiving updated wireless credentials from the station, wherein the updated wireless credentials are input by a user to the station; and (e) overwriting pre-existing wireless credentials with the updated wireless credentials.

According to an embodiment of the invention, the request for updated wireless credentials comprises a keying message, wherein the keying message, when received at the station, causes a prompt for user-input of updated wireless credentials to be displayed at a display interface associated with the station.

According to an embodiment of the invention, the updated wireless credentials are received at the access point within an encrypted message output from the station, and the encrypted message is decrypted to retrieve the updated wireless credentials.

According to an embodiment of the invention, the method described above further comprises: (a) preventing an output of traffic from the access point to a wide area network or local area network; (b) directing a web application at the station to a web page graphical user interface, wherein the web page graphical user interface prompts a user for input of updated wireless credentials; and (c) wherein the updated wireless credentials are received at the access point as user input to the web page graphical user interface.

According to an embodiment of the invention, the web page graphical user interface is hosted by a server at the access point.

According to an embodiment of the invention, the output of traffic from the access point to a wide area network or local area network is prevented when a response to the request for updated wireless credentials is not received from the station after a predetermined period of time.

According to an embodiment of the invention, the predetermined input comprises depressing a button for a predetermined duration of time, wherein the button is physically located at the access point and is designated for initiating a wireless protected setup.

An embodiment of the invention described herein may include an apparatus comprising: (a) an interface configured to be used to receive a predetermined input, wherein the predetermined input signals an initiation of an extended wireless protected setup between an access point and a station; (b) a module configured to establish a wireless association between the access point and the station; (c) an interface configured to be used to: (i) output a request for updated wireless credentials, wherein the request is output to the station; and (ii) receive updated wireless credentials from the station, wherein the updated wireless credentials are input by a user to the station; and (d) a module configured to overwrite pre-existing wireless credentials with the updated wireless credentials.

An embodiment of the invention described herein may include one or more non-transitory computer readable media having instructions operable to cause one or more processors to perform the operations comprising: (a) receiving a predetermined input at an access point, wherein the predetermined input signals an initiation of an extended wireless protected setup between the access point and a station; (b) establishing a wireless association between the access point and the station; (c) outputting a request for updated wireless credentials, wherein the request is output to the station; (d) receiving updated wireless credentials from the station, wherein the updated wireless credentials are input by a user to the station; and (e) overwriting pre-existing wireless credentials with the updated wireless credentials.

FIG. 1 is a block diagram illustrating an example network environment 100 operable to facilitate an overwrite of wireless credentials with user-input credentials. In embodiments, one or more customer premise equipment (CPE) devices (e.g., station 110, access point 120, and other devices that are not shown) may provide video and/or data services to a subscriber. An access point 120 may communicate with one or more stations 110 over a local network 130 (e.g., a local area network (LAN), a wireless local area network (WLAN), a personal area network (PAN), etc.) and may communicate with an upstream wide area network (WAN) 140 through a connection to a provider network 150. Stations 110 may include a set-top box (STB), computer, mobile device, tablet, or any other device operable to communicate wirelessly with an access point 120. An access point 120 may include a gateway device, a modem, a wireless router including an embedded modem, a wireless network extender or any other device operable to deliver data and/or video services from the WAN 130 to the station 110.

In embodiments, an access point 120 may communicate with a station 110 over a wired or a wireless connection. A wireless connection between the station 110 and access point 120 may be established through a protected setup sequence (e.g., Wi-Fi protected setup (WPS)). The protected setup sequence may include the steps of scanning multiple wireless channels for an available access point, exchanging one or more messages between a station and access point, exchanging key messages (e.g., pre-shared key (PSK)) between the station and access point, and installing a key (e.g., PSK) at the station.

In embodiments, an access point 120 may be configured to initiate an extended wireless setup upon reception of a predetermined input. For example, when a physical button (e.g., WPS button) located at the access point 120 is depressed for a predetermined duration (e.g., 5, 6, 7 seconds, etc.), the access point 120 may initiate an extended wireless setup with a station 110, wherein the extended wireless setup includes a wireless setup with the station 110 and a configuration of wireless credentials based upon user input received from the station 110. The predetermined input may be defined within the access point 120 static configuration file, and the button sequence may be altered by a service provider or subscriber.

In embodiments, when an extended wireless setup is initiated at the access point 120, the access point 120 may output a request to a station 110 for a user-input of updated wireless credentials. The request may be output from the access point 120 as a keying message (e.g., extensible authentication protocol (EAP) message, lightweight EAP (LEAP) message, etc.). The keying message, when received by the station 110, may cause a prompt for user-input of wireless credentials to be displayed (e.g., within a textual user interface (TUI) or graphical user interface (GUI)) at the station 110 or at a display device associated with the station 110. The user may input updated wireless credentials at the station 110, and the updated wireless credentials may be output from the station 110 to the access point 120.

In embodiments, user input of updated wireless credentials may be received at an access point 120 via a web page hosted at the access point 120. When traffic is received from a station 110 at the access point 120 during an extended wireless setup period, the access point 120 may block the output of the traffic and may direct the station 110 to a web page GUI prompting a user for the input of updated wireless credentials. A web server hosting the web page GUI from the access point 120 may receive updated wireless credentials input by a user at the web page GUI that is presented to the user through a web page application operating on the station 110.

In embodiments, the access point 120 may overwrite currently used wireless credentials with updated wireless credentials received from user input (e.g., user input credentials received in response to a keying message or received through a web page GUI). The access point 120 may use the updated wireless credentials for establishing future wireless connections with one or more stations.

Figure 2:
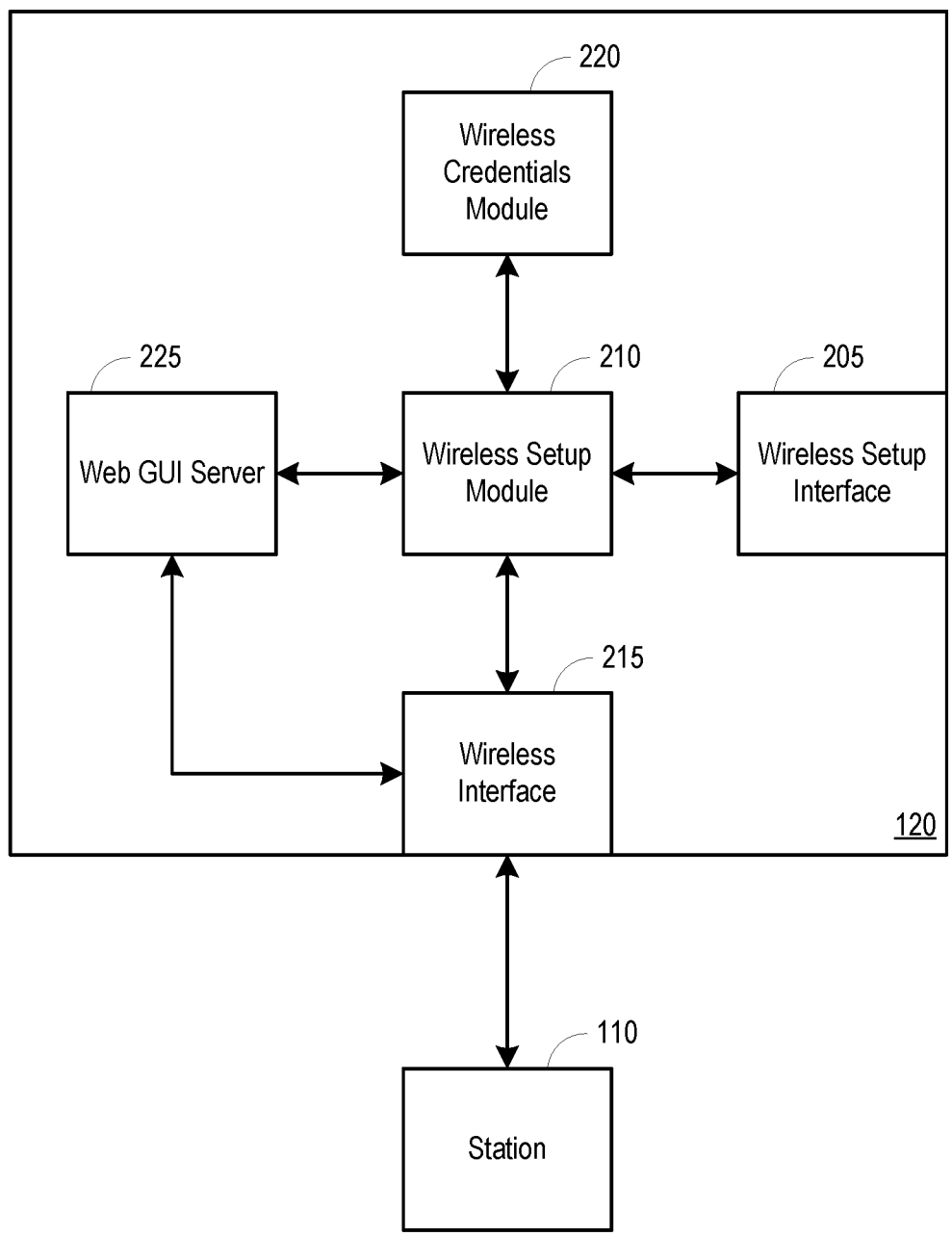
FIG. 2 is a block diagram illustrating an example access point operable to facilitate an overwrite of wireless credentials with user-input credentials.

FIG. 2 is a block diagram illustrating an example access point 120 operable to facilitate an overwrite of wireless credentials with user-input credentials. The access point 120 may include a wireless setup interface 205, wireless setup module 210, wireless interface 215, wireless credentials module 220, and web GUI server 225.

In embodiments, the access point 120 may receive, through the wireless setup interface 205, a predetermined input for initiating an extended wireless setup with a station 110. The wireless setup interface 205 may include one or more physical buttons (e.g., WPS button), and the predetermined input for initiating an extended wireless setup between the access point 120 and a station 110 may be the depressing of one or more of the physical buttons for a predetermined duration. For example, when a physical button (e.g., WPS button) located at the wireless setup interface 205 is depressed for a predetermined duration (e.g., 5, 6, 7 seconds, etc.), the access point 120 may initiate an extended wireless setup with a station 110, wherein the extended wireless setup includes a wireless setup with the station 110 and a configuration of wireless credentials based upon user input received from the station 110. It should be understood that various other methods may be used for delivering a predetermined input to an access point 120.

In embodiments, the wireless setup module 210 may recognize a predetermined input for initiating an extended wireless setup when the predetermined input is received at the wireless setup interface 205. When the predetermined input is recognized, the wireless setup module 210 may initiate a wireless setup procedure (e.g., WPS) with a station 110. For example, the wireless setup module 210 may pass one or more wireless communications to a station 110 through a wireless interface 215. The wireless interface 215 may be used to provide an interface with a variety of wireless networks (e.g., Wi-Fi repeater/bridge/extender, Bluetooth network, ZigBee network, etc.).

In embodiments, when a successful connection between the access point 120 and station 110 has been established through the wireless interface 215, a user-input of wireless credentials may be requested, and user-input wireless credentials may be applied at the access point 120. While operating in an extended wireless setup mode, the access point 120 may output a request for new or updated wireless credentials. The request for new or updated wireless credentials may be output from the wireless setup module 210 to a station 110. For example, the request for new or updated wireless credentials may be output to the station 110 that successfully connected to the access point 120 during the extended wireless setup procedure. In embodiments, the request for new or updated wireless credentials may be output from the wireless setup module 210 as a keying message (e.g., extensible authentication protocol (EAP) message, lightweight EAP (LEAP) message, etc.). The keying message, when received by the station 110, may cause a prompt for user-input of wireless credentials to be displayed (e.g., within a textual user interface (TUI) or graphical user interface (GUI)) at the station 110 or at a display device associated with the station 110.

In embodiments, a response to the request for user-input of wireless credentials may be received at the wireless setup module 210 from the station 110 via the wireless interface 215. The response may include user-input wireless credentials (e.g., PSK) to be applied at the access point 120 for use in future connections with one or more stations. User-input credentials may be encrypted before being output from the station 110. For example, a decodable public encryption algorithm (e.g., base64) or a decodable private encryption algorithm may be used to encrypt the user-input credentials before being output from the station 110 to the access point 120. The wireless setup module 210 may be configured to decode the encrypted credentials received from the station 110.

In embodiments, outbound traffic from the access point 120 to a wide-area network (WAN) or local-area network (LAN) may be blocked. For example, outbound traffic may be blocked when a response to a request for user-input of wireless credentials is not received at the access point 120. The wireless setup module 210 may cause a wireless router associated with the access point 120 to block traffic from being output to a WAN or LAN. For example, routing rules (e.g., iptables rules) may be created such that outbound traffic to a WAN or LAN is blocked, thus the only allowed traffic destination is the Internet protocol (IP) address of the access point 120. In embodiments, outbound traffic from the access point 120 may be blocked in response to a determination that the station 110 is not configured to respond to a private keying message that is delivered to the station 110 from the access point 120.

In embodiments, when a station 110 is unable to respond to a private keying message, a user may be directed to a web page prompting user input of updated wireless credentials that are to be applied. For example, when outbound traffic to a WAN or LAN is blocked, a station 110 (e.g., mobile device, tablet, etc.) may detect that Internet access is being blocked. The station 110 may notify a user of the blocked or limited Internet access by outputting or displaying a notification at the station 110 or display device associated with the station 110 (e.g., pop-up notification such as a request that the user login to a wireless network). When the user responds to the displayed notification (e.g., by attempting to login into a wireless network), the user may be directed to a web page prompting input of wireless credentials.

In embodiments, the web page may be generated and provided by the web GUI server 225, and may be accessed by a user through a browsing application associated with the station 110. Wireless credentials input by a user at the provided web page may be received at the web GUI server 225. The web page GUI presented to the user may include a text field within which the user may input an updated wireless credential (e.g., PSK). The wireless credentials input into the web page GUI may be received by the web GUI server 225 at the access point 120.

In embodiments, wireless credentials may be stored at the wireless credentials module 220. When user-input wireless credentials are received from a station 110 at the wireless setup module 210 (e.g., from an encrypted message received directly from a station 110 or from an entry made in a webpage provided by the web GUI server 225), the wireless setup module 210 may update the wireless credentials stored at the wireless credentials module 220. In embodiments, the wireless credentials module 220 may include storage (e.g., non-volatile memory), and wireless credentials associated with the access point 120 and/or one or more stations 110 may be maintained within storage. Previously used or current wireless credentials may be replaced or overwritten by user-input credentials received at the access point 120. For example, a PSK field within non-volatile memory of the wireless credentials module 220 may be updated with the user-input wireless credentials received from the station 110. The new PSK may be used by the access point 120 for future wireless connections with one or more stations.

Figure 3:
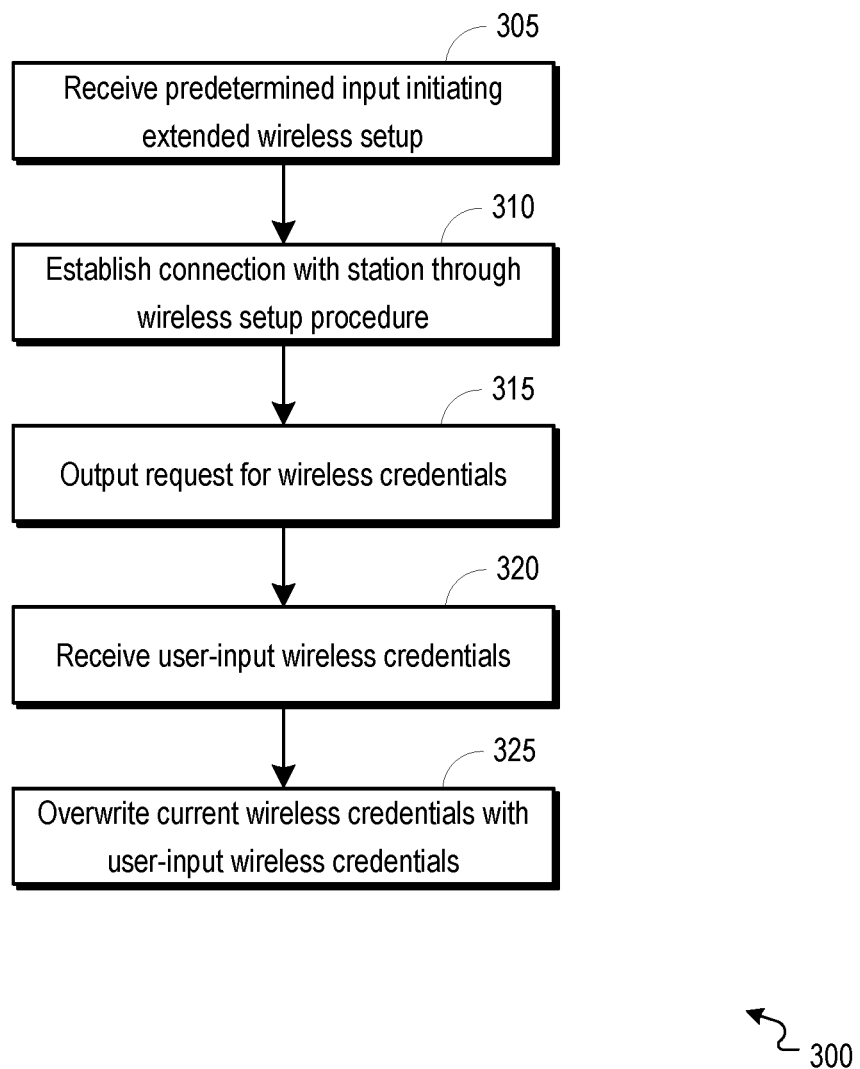
FIG. 3 is a flowchart illustrating an example process operable to facilitate an overwrite of wireless credentials with user-input credentials.

FIG. 3 is a flowchart illustrating an example process 300 operable to facilitate an overwrite of wireless credentials with user-input credentials. The process 300 may begin at 305, when a predetermined input for initiating an extended wireless setup between a station 110 and access point 120 is received at the access point 120. In embodiments, the predetermined input for initiating an extended wireless setup between a station 110 and an access point 120 may be the depressing of a button associated with a wireless setup procedure for a predetermined duration. For example, when a physical button (e.g., WPS button) located at the access point 120 (e.g., wireless setup interface 205 of FIG. 2) is depressed for a predetermined duration (e.g., 5, 6, 7 seconds, etc.), the access point 120 may initiate an extended wireless setup with a station 110, wherein the extended wireless setup includes a wireless setup with the station 110 and a configuration of wireless credentials based upon user input received from the station 110. It should be understood that various other methods may be used for delivering a predetermined input to an access point 120.

At 310, a connection with a station may be established through a wireless setup procedure. When the predetermined input is received by an access point 120, the setup procedure (e.g., WPS) between the station 110 and the access point 120 may be initiated. The setup procedure may result in a successful wireless connection between the access point 120 and station 110, the connection being sufficient to support the delivery of wireless communications between the access point 120 and station 110. In embodiments, the determination may be made that the setup procedure resulted in a successful connection between the access point 120 and station 110 when a final key message is sent from the access point 120 and received by the station 110. During the setup procedure, default or predefined credentials (e.g., passcode, passphrase, PSK, etc.) may be output from the access point 120 to the station 110.

At 315, a request for new or updated wireless credentials may be output. The request for new or updated wireless credentials may be output from an access point 120 while the access point 120 is still operating in the extended wireless setup mode. The request for new or updated wireless credentials may be output to the station 110 successfully connecting to the access point 120. In embodiments, the request for new or updated wireless credentials may be output as a keying message (e.g., extensible authentication protocol (EAP) message, lightweight EAP (LEAP) message, etc.). The keying message, when received by the station 110, may cause a prompt for user-input of wireless credentials to be displayed (e.g., within a graphical user interface (GUI)) at the station 110 or at a display device associated with the station 110.

At 320, user-input wireless credentials may be received. User-input credentials may be received at the access point 120 from the station 110 that is connected to the access point 120 through the extended wireless setup. The user-input credentials may be input at the station 110 or at a display device associated with the station 110 in response to a prompt for the input of wireless credentials. In embodiments, the prompt for the input of wireless credentials may be displayed as a GUI. A user may input a new PSK that is to be used by the access point 120 during wireless setup with other stations.

User-input credentials may be encrypted before being output from the station 110. For example, a decodable public encryption algorithm (e.g., base 64) or a decodable private encryption algorithm may be used to encrypt the user-input credentials before being output from the station 110 to the access point 120. The access point 120 may decode the encrypted credentials received from the station 110.

At 325, user-input wireless credentials may be used to overwrite wireless credentials that are currently configured at the access point 120. Wireless credentials may be stored at the access point 120 (e.g., at non-volatile memory), and the access point 120 may overwrite the currently stored wireless credentials with the user-input wireless credentials received from the station 110. For example, a PSK field within non-volatile memory (e.g., wireless credentials module of FIG. 2) may be updated with the user-input wireless credentials received from the station 110. The new PSK may be used by the access point 120 for future wireless connections with one or more stations.

Figure 4:
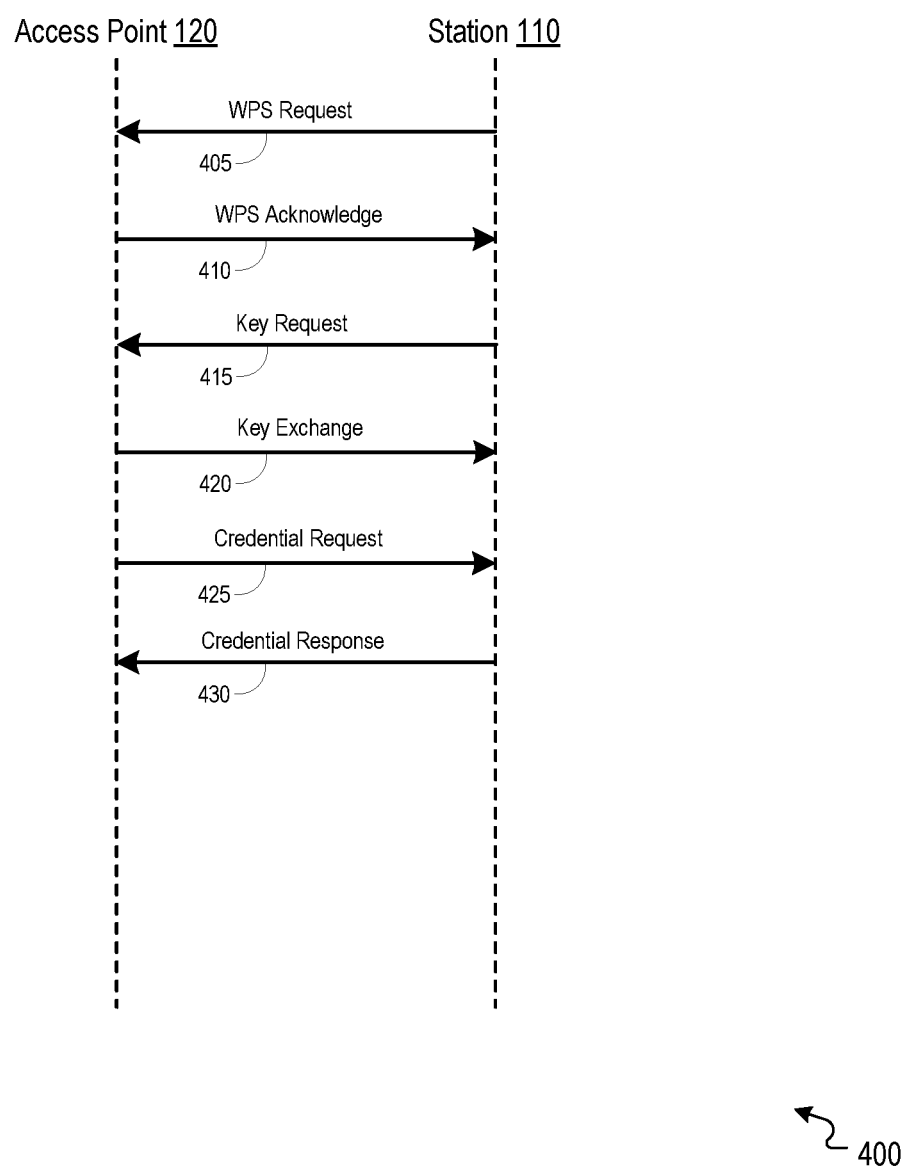
FIG. 4 is a communication flow diagram illustrating an example communication exchange operable to facilitate the request and retrieval of updated wireless credentials through keying messages.

FIG. 4 is a communication flow diagram illustrating an example communication exchange 400 operable to facilitate the request and retrieval of updated wireless credentials. When an extended wireless setup is initiated at an access point 120, a station 110 may begin a wireless protected setup (WPS) with the access point 120 by outputting a WPS request 405 to the access point 120. The access point 120 may respond to the WPS request 405 by outputting a WPS Acknowledgment 410 to the station 110, the WPS acknowledgment 410 serving to inform the station 110 that the WPS has started.

In embodiments, as part of the WPS procedure, a key request 415 may be output from the station 110 to the access point 120. The key request 415 may be a request for a key associated with the access point 120, wherein the key is used by the station 110 to establish a successful connection with the access point 120. The access point 120 may respond to the key request 415 with one or more key exchange messages 420. The one or more key exchange messages 420 may include one or more elements of a key associated with the access point 120.

In embodiments, the access point 120 may output a credential request 425 to the station 110. The credential request 425 may be a keying message (e.g., extensible authentication protocol (EAP) message, lightweight EAP (LEAP) message, etc.). The keying message, when received by the station 110, may cause a prompt for user-input of wireless credentials to be displayed (e.g., within a graphical user interface (GUI)) at the station 110 or at a display device associated with the station 110. The user may input wireless credentials at the station 110 (e.g., input into the displayed GUI) in response to the credential request 425, and the user-input wireless credentials may be output to the access point 120 as a credential response 430. In embodiments, a decodable public encryption (e.g., base64 encryption) or decodable private encryption may be used to encrypt the user-input credentials (e.g., PSK) before being output from the station 110 to the access point 120. The access point 120 may decode the encrypted credentials received from the station 110.

Figure 5:
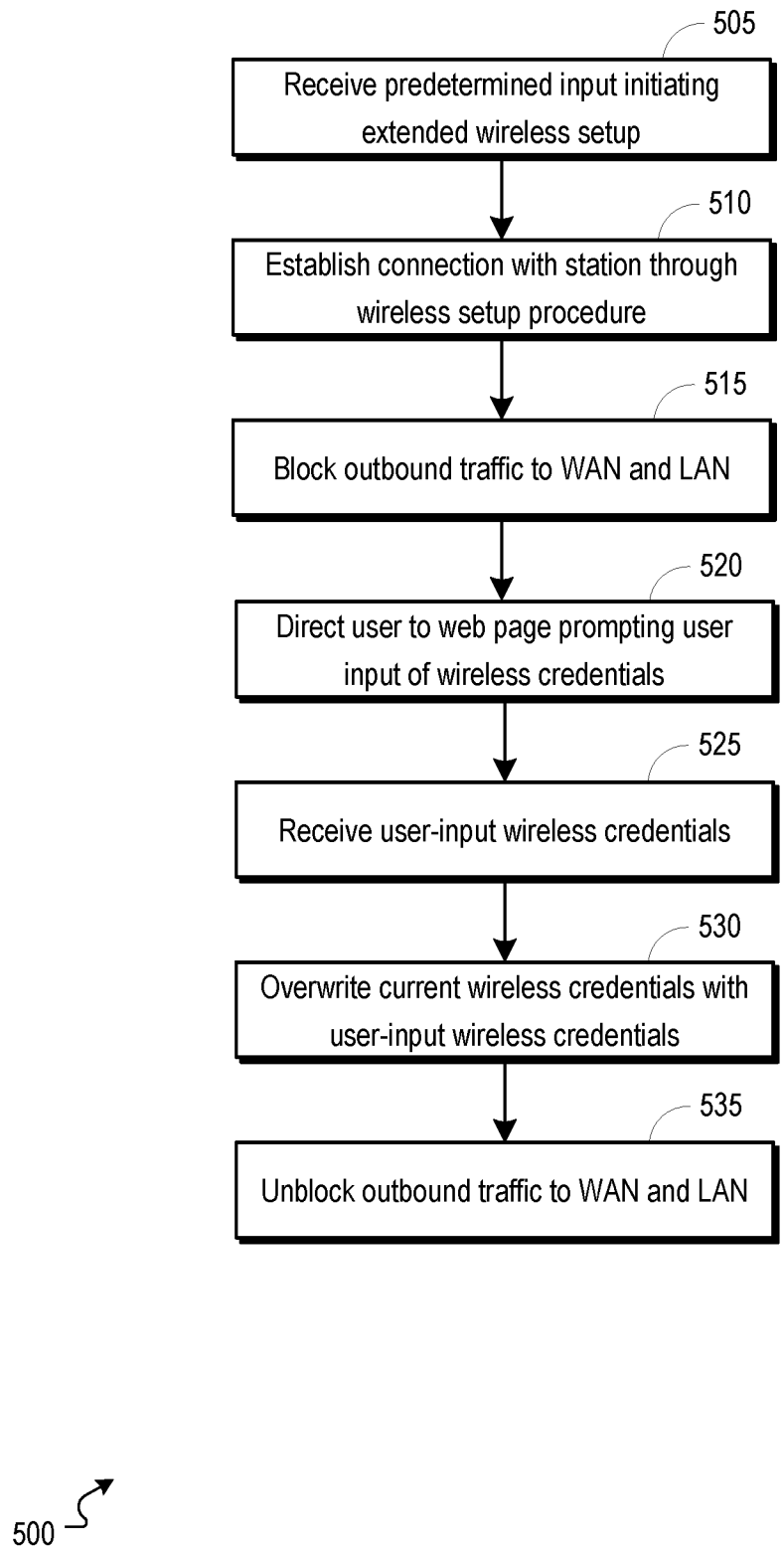
FIG. 5 is a flowchart illustrating an example process operable to facilitate an overwrite of wireless credentials with user-input credentials received through a web page GUI.

FIG. 5 is a flowchart illustrating an example process 500 operable to facilitate an overwrite of wireless credentials with user-input credentials received through a webpage GUI. The process 500 can begin at 505, when a predetermined input for initiating an extended wireless setup between a station 110 and access point 120 is received at the station 110. In embodiments, the predetermined input for initiating an extended wireless setup between a station 110 and an access point 120 may be the depressing of a button associated with a wireless setup procedure for a predetermined duration. For example, when a physical button (e.g., WPS button) located at the access point 120 (e.g., wireless setup interface 205 of FIG. 2) is depressed for a predetermined duration (e.g., 5, 6, 7 seconds, etc.), the access point 120 may initiate an extended wireless setup with a station 110, wherein the extended wireless setup includes a wireless setup with the station 110 and a configuration of wireless credentials based upon user input received from the station 110. It should be understood that various other methods may be used for delivering a predetermined input to an access point 120.

At 510, a connection with a station may be established through a wireless setup procedure. When the predetermined input is received by an access point 120, the setup procedure (e.g., WPS) between the station 110 and the access point 120 can be initiated. The setup procedure may result in a successful wireless connection between the access point 120 and station 110, the connection being sufficient to support the delivery of wireless communications between the access point 120 and station 110. In embodiments, the determination may be made that the setup procedure resulted in a successful connection between the access point 120 and station 110 when a final key message is sent from the access point 120 and received by the station 110. During the setup procedure, default or predefined credentials (e.g., passcode, passphrase, PSK, etc.) may be output from the access point 120 to the station 110.

At 515, outbound traffic from the access point 120 to a wide-area network (WAN) or local-area network (LAN) may be blocked. In embodiments, a wireless router associated with the access point 120 may be configured to block traffic from being output to a WAN or LAN. For example, routing rules (e.g., iptables rules) may be created such that outbound traffic to a WAN or LAN is blocked, thus the only allowed traffic destination is the Internet protocol (IP) address of the access point 120. In embodiments, outbound traffic from the access point 120 may be blocked in response to a determination that the station 110 is not configured to respond to a private keying message that is delivered to the station 110 from the access point 120.

At 520, a user may be directed to a web page prompting user input of updated wireless credentials to be applied at the access point. In embodiments, when outbound traffic to a WAN or LAN is blocked, a station 110 (e.g., mobile device, tablet, etc.) may detect that Internet access is being blocked. The station 110 may notify a user of the blocked or limited Internet access by outputting or displaying a notification at the station 110 or display device associated with the station 110 (e.g., pop-up notification such as a request that the user login to a wireless network). When the user responds to the displayed notification (e.g., by attempting to login into a wireless network), the user may be directed to a web page prompting input of wireless credentials. The web page may be accessed using a browsing application associated with the station 110, and the web page may be provided by a webserver embedded in the access point 120 (e.g., web GUI server 225 of FIG. 2).

At 525, user-input wireless credentials may be received at the access point 120. User-input credentials may be received at the access point 120 from the webserver (e.g., web GUI server 225 of FIG. 2) providing the web page GUI through which a user may input wireless credentials. The web page GUI presented to the user may include a text field within which the user may input an updated wireless credential (e.g., PSK). The wireless credentials input into the web page GUI may be received by the webserver at the access point 120.

At 530, user-input wireless credentials may be used to overwrite wireless credentials that are currently configured at the access point 120. Wireless credentials may be stored at the access point 120 (e.g., at non-volatile memory), and the access point 120 may overwrite the currently stored wireless credentials with the user-input wireless credentials received via the webpage GUI presented to a user. For example, a PSK field within non-volatile memory (e.g., wireless credentials module 220 of FIG. 2) may be updated with the user-input wireless credentials received from the user. The new PSK may be used by the access point 120 for future wireless connections with one or more stations.

AT 535, the output of outbound traffic to a WAN and/or LAN may be unblocked. In embodiments, traffic blocking rules (e.g., iptable rules) may be cleared and traffic routing functions by the access point 120 may resume according to a default set of rules.

Figure 6:
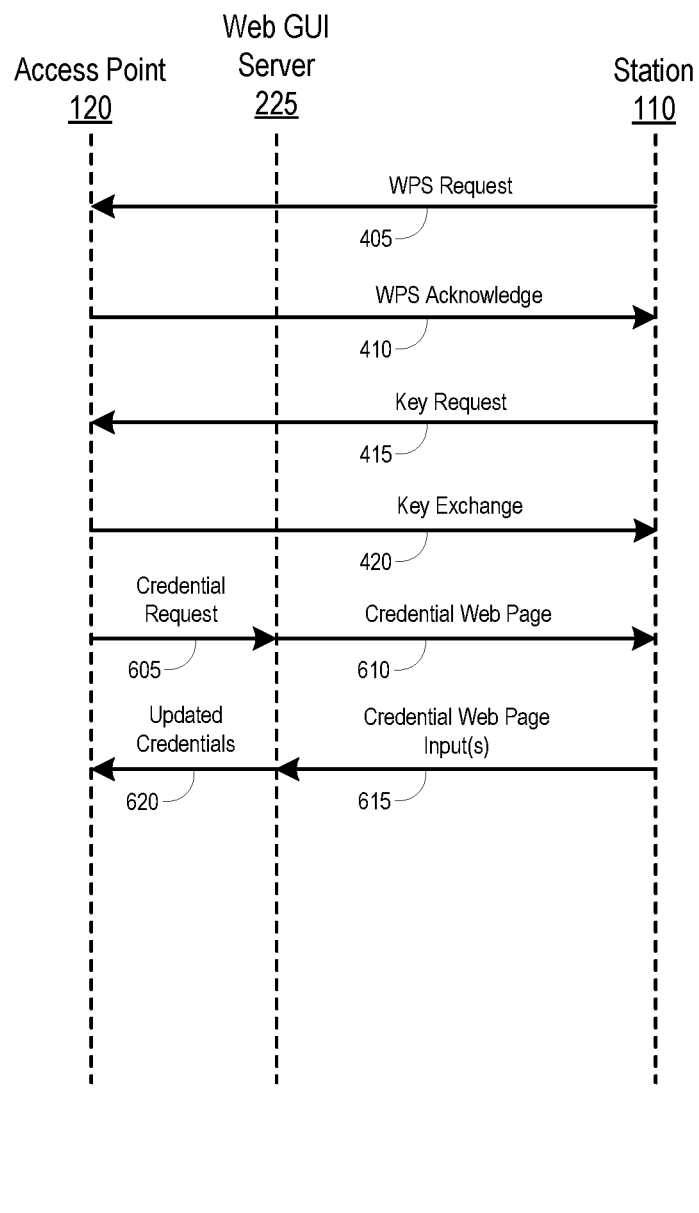
FIG. 6 is a communication flow diagram illustrating an example communication exchange operable to facilitate the request and retrieval of updated wireless credentials through a web page GUI.

FIG. 6 is a communication flow diagram illustrating an example communication exchange 600 operable to facilitate the request and retrieval of updated wireless credentials received through a webpage GUI. When an extended wireless setup is initiated at an access point 120, a station 110 may begin a wireless protected setup (WPS) with the access point 120 by outputting a WPS request 405 to the access point 120. The access point 120 may respond to the WPS request 405 by outputting a WPS Acknowledgment 410 to the station 110, the WPS acknowledgment 410 serving to inform the station 110 that the WPS has started.

In embodiments, as part of the WPS procedure, a key request 415 may be output from the station 110 to the access point 120. The key request 415 may be a request for a key associated with the access point 120, wherein the key is used by the station 110 to establish a successful connection with the access point 120. The access point 120 may respond to the key request 415 with one or more key exchange messages 420. The one or more key exchange messages 420 may include one or more elements of a key associated with the access point 120.

In embodiments, the access point 120 may request updated wireless credentials (e.g., credential request 605) from a web GUI server 225. The credential request 605 may be output to the web GUI server 225, for example, when the access point 120 does not receive a response to a keying message (e.g., credential request 425 of FIG. 4) that is output to the station 110. The credential request 605 may be output to the web GUI server 225 in response to the reception of a communication from the station 110 that is targeted at a WAN or LAN. For example, the access point 120 may block the communication targeted at the WAN or LAN, and may output the credential request 605 to the web GUI server 225. It should be understood that the web GUI server 225 may be embedded within the access point 120.

The web GUI server 225 may generate and output a credential web page 610 to the station 110. In embodiments, the credential web page 610 may be displayed within a browsing application associated with the station 110. The credential web page 610 may be a textual user interface (TUI) or graphical user interface (GUI) and may include a text field within which the user may input an updated wireless credential (e.g., PSK).

A user may input wireless credentials (e.g., PSK) into the credential web page 610 that is displayed to the user. The credential web page input(s) 615 may be received by the web GUI server 225 and updated credentials 620 may be stored at the access point 120 for future use in connecting one or more other stations.

Figure 7:
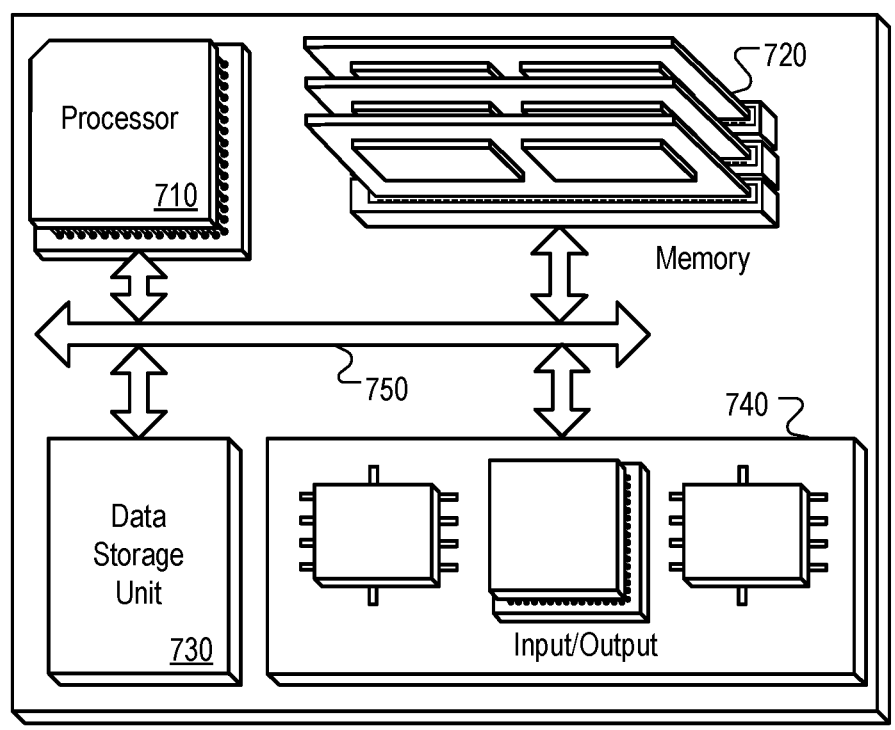
FIG. 7 is a block diagram of a hardware configuration operable to facilitate an overwrite of wireless credentials with user-input credentials.

FIG. 7 is a block diagram of a hardware configuration 700 operable to facilitate an overwrite of wireless credentials with user-input credentials. The hardware configuration 700 can include a processor 710, a memory 720, a storage device 730, and an input/output device 740. Each of the components 710, 720, 730, and 740 can, for example, be interconnected using a system bus 750. The processor 710 can be capable of processing instructions for execution within the hardware configuration 700. In one implementation, the processor 710 can be a single-threaded processor. In another implementation, the processor 710 can be a multi-threaded processor. The processor 710 can be capable of processing instructions stored in the memory 720 or on the storage device 730.

The memory 720 can store information within the hardware configuration 700. In one implementation, the memory 720 can be a computer-readable medium. In one implementation, the memory 720 can be a volatile memory unit. In another implementation, the memory 720 can be a non-volatile memory unit.

In some implementations, the storage device 730 can be capable of providing mass storage for the hardware configuration 700. In one implementation, the storage device 730 can be a computer-readable medium. In various different implementations, the storage device 730 can, for example, include a hard disk device, an optical disk device, flash memory or some other large capacity storage device. In other implementations, the storage device 730 can be a device external to the hardware configuration 700.

The input/output device 740 provides input/output operations for the hardware configuration 700. In one implementation, the input/output device 740 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a CPE device (e.g., access point 120 of FIG. 1, cable modem, router, wireless extender, or other access device) or subscriber device (e.g., station 110 of FIG. 1, television, mobile device, tablet, STB, etc.). In another implementation, the input/output device can include driver devices configured to send communications to, and receive communications from one or more networks (e.g., WAN 140 of FIG. 1, local network 130 of FIG. 1, etc.).

Those skilled in the art will appreciate that the invention described herein improves upon methods and systems for updating wireless credentials at an access point. Methods, systems, and computer readable media may be operable to facilitate an overwrite of wireless credentials with user-input credentials. An extended wireless setup may be initiated at an access point when a predetermined input is received. During the extended wireless setup period, the access point may request updated wireless credentials from a user via a direct message or through a web page interface. The access point may overwrite currently used wireless credentials with the updated wireless credentials received from user input, and the access point may use the updated wireless credentials for establishing future wireless connections with one or more stations.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
   receiving a predetermined input at an access point, wherein the predetermined input signals an initiation of an extended wireless protected setup between the access point and a station;
   establishing a wireless association between the access point and the station;
   outputting a request for updated wireless credentials, wherein the request is output to the station;
   receiving updated wireless credentials from the station, wherein the updated wireless credentials are input by a user to the station;
   preventing an output of traffic from the access point to a wide area network or local area network;
   directing a web application at the station to a web page graphical user interface, wherein the web page graphical user interface prompts a user for input of updated wireless credentials, and wherein the web page graphical user interface is hosted by a server at the access point; and
   wherein the updated wireless credentials are received at the access point as user input to the web page graphical user interface;
   overwriting pre-existing wireless credentials with the updated wireless credentials.

2. The method of claim 1, wherein the request for updated wireless credentials comprises a keying message, wherein the keying message, when received at the station, causes a prompt for user-input of updated wireless credentials to be displayed at a display interface associated with the station.

3. The method of claim 2, further comprising:
   wherein the updated wireless credentials are received at the access point within an encrypted message output from the station; and
   decrypting the encrypted message to retrieve the updated wireless credentials.

4. The method of claim 1, wherein the output of traffic from the access point to a wide area network or local area network is prevented when a response to the request for updated wireless credentials is not received from the station after a predetermined period of time.

5. The method of claim 1, wherein the predetermined input comprises depressing a button for a predetermined duration of time, wherein the button is physically located at the access point and is designated for initiating a wireless protected setup.

6. An apparatus comprising:
   an interface configured to be used to receive a predetermined input, wherein the predetermined input signals an initiation of an extended wireless protected setup between an access point and a station;
   a module configured to establish a wireless association between the access point and the station;
   an interface configured to be used to:
   output a request for updated wireless credentials, wherein the request is output to the station; and
   receive updated wireless credentials from the station, wherein the updated wireless credentials are input by a user to the station;
   prevent an output of traffic from the access point to a wide area network or local area network;
   direct a web application at the station to a web page graphical user interface, wherein the web page graphical user interface prompts a user for input of updated wireless credentials, and wherein the web page graphical user interface is hosted by a server at the access point; and
   wherein the updated wireless credentials are received at the access point as user input to the web page graphical user interface;
   a module configured to overwrite pre-existing wireless credentials with the updated wireless credentials.

7. The apparatus of claim 6, wherein the request for updated wireless credentials comprises a keying message, wherein the keying message, when received at the station, causes a prompt for user-input of updated wireless credentials to be displayed at a display interface associated with the station.

8. The apparatus of claim 6, wherein the output of traffic to a wide area network or local area network is prevented when a response to the request for updated wireless credentials is not received from the station after a predetermined period of time.

9. The apparatus of claim 6, further comprising:
   a button designated for initiating a wireless protected setup, wherein the predetermined input comprises depressing the button for a predetermined duration of time.

10. One or more non-transitory computer readable media having instructions operable to cause one or more processors to perform the operations comprising:
    receiving a predetermined input at an access point, wherein the predetermined input signals an initiation of an extended wireless protected setup between the access point and a station;
    establishing a wireless association between the access point and the station;
    outputting a request for updated wireless credentials, wherein the request is output to the station;
    receiving updated wireless credentials from the station, wherein the updated wireless credentials are input by a user to the station;
    preventing an output of traffic from the access point to a wide area network or local area network;
    directing a web application at the station to a web page graphical user interface, wherein the web page graphical user interface prompts a user for input of updated wireless credentials, and wherein the web page graphical user interface is hosted by a server at the access point; and
    wherein the updated wireless credentials are received at the access point as user input to the web page graphical user interface;
    overwriting pre-existing wireless credentials with the updated wireless credentials.

11. The one or more non-transitory computer-readable media of claim 10, wherein the request for updated wireless credentials comprises a keying message, wherein the keying message, when received at the station, causes a prompt for user-input of updated wireless credentials to be displayed at a display interface associated with the station.

12. The one or more non-transitory computer-readable media of claim 11, wherein the instructions are further operable to cause one or more processors to perform the operations comprising:
    wherein the updated wireless credentials are received at the access point within an encrypted message output from the station; and
    decrypting the encrypted message to retrieve the updated wireless credentials.

13. The one or more non-transitory computer-readable media of claim 10, wherein the output of traffic from the access point to a wide area network or local area network is prevented when a response to the request for updated wireless credentials is not received from the station after a predetermined period of time.

14. The one or more non-transitory computer-readable media of claim 10, wherein the predetermined input comprises depressing a button for a predetermined duration of time, wherein the button is physically located at the access point and is designated for initiating a wireless protected setup.

* * * * *